United States Patent
Eiraku et al.

[11] Patent Number: 5,841,501
[45] Date of Patent: Nov. 24, 1998

[54] LIQUID CRYSTAL DISPLAY DEVICE

[75] Inventors: Takayuki Eiraku; Isao Edane, both of Kawasaki, Japan

[73] Assignee: Fujitsu Limited, Kawasaki, Japan

[21] Appl. No.: 584,616

[22] Filed: Jan. 11, 1996

[30] Foreign Application Priority Data

Aug. 14, 1995 [JP] Japan ................................. 7-207217

[51] Int. Cl.$^6$ ........................ G02F 1/1345; G02F 1/1333
[52] U.S. Cl. ......................... 349/150; 349/149; 349/58
[58] Field of Search ............................ 359/87, 88, 83, 359/62; 349/143, 149, 150, 84, 58

[56] References Cited

U.S. PATENT DOCUMENTS

| | | | |
|---|---|---|---|
| 4,772,100 | 9/1988 | Suenaga | 349/149 |
| 4,862,153 | 8/1989 | Nakatani et al. | 349/58 |
| 4,927,493 | 5/1990 | Yamazaki et al. | 349/143 |
| 5,105,265 | 4/1992 | Sato et al. | 349/8 |
| 5,193,022 | 3/1993 | Hirai | 349/150 |
| 5,212,576 | 5/1993 | Yoshioda | 349/149 |
| 5,341,233 | 8/1994 | Tomoike et al. | 349/149 |
| 5,436,745 | 7/1995 | Voisin et al. | 349/150 |
| 5,528,403 | 6/1996 | Kawaguchi et al. | 349/199 |

FOREIGN PATENT DOCUMENTS

| | | | |
|---|---|---|---|
| 59-116722 | 7/1984 | Japan | 349/149 |
| 60-213928 | 10/1985 | Japan | 349/149 |
| 63-300224 | 12/1988 | Japan | 349/149 |
| 63-311234 | 12/1988 | Japan | 349/149 |
| 4-11225 | 1/1992 | Japan | 349/149 |
| 4-000489 | 6/1992 | Japan | 349/149 |
| 5-119334 | 5/1993 | Japan | 349/149 |

*Primary Examiner*—William L. Sikes
*Assistant Examiner*—Toan Ton
*Attorney, Agent, or Firm*—Greer, Burns & Crain, Ltd.

[57] ABSTRACT

A light valve is loaded with a liquid crystal display element and electronic components which drive the liquid crystal display element. The light valve further has in a periphery thereof input terminal parts to which signals for driving the liquid crystal display element are supplied. A flexible circuit substrate is connected with the input terminal parts. The circuit substrate is divided into a plurality of division substrates, a number of the plurality of division substrates corresponding to a number of the input terminal parts. The plurality of division substrates are electrically connected with each other.

21 Claims, 9 Drawing Sheets

LIQUID CRYSTAL DISPLAY DEVICE

BACKGROUND OF THE INVENTION

1. Field of the Invention

The present invention relates to a liquid crystal display device, and in particular, to a liquid crystal display device including a light valve having a liquid crystal display element mounted thereon and a circuit substrate.

For example, as a projection display apparatus, a device has been made that is suitable for practical use, which device uses a liquid crystal display device, forms an image modulation light made of a single primary color, superimposes primary color lights of three primary colors on one another and projects a resulting image on a screen after magnifying it.

The liquid crystal display device provided in the projection display apparatus includes a light valve having a liquid crystal display element mounted thereon and a circuit substrate. This circuit substrate is connected with the light valve and is electrically connected with the liquid crystal display element.

Therefore, if the connection between the light valve and circuit substrate is not a perfect one, there is a possibility that the liquid crystal display element will not operate correctly. In order to prevent such a situation from occurring, it is necessary to ensure that there is a connection between the light valve and circuit substrate.

2. Description of the Related Art

FIGS. 1 and 2 show a liquid crystal display device 1 in the related art. FIG. 1 shows a exploded perspective view and FIG. 2 shows a perspective view of an assembled form of the liquid crystal display device 1. In general, the liquid crystal display device 1 includes a light valve 2 and a circuit substrate 3. The light valve 2 is provided with an emission substrate 4 and an incident substrate 5 (both made from glass plates). In this arrangement, an area 6 defined by a broken line in the figures acts as a liquid crystal display element 6.

Further, an area of the emission substrate 4 is defined to be larger than an area of the incident substrate 5. The incident substrate 5 is overlaid on the emission substrate 4. In the overlaid state, a plurality of flexible substrates 8 (provided by a TAB (Tape Automated Bonding) method and simply referred to as a TAB) having driving ICs (Integrated Circuits) 7 arranged thereto are connected to a part of the emission substrate 4, which part extends around the incident substrate 5.

The circuit substrate 3 is a printed-circuit board wherein connection terminals 9 are formed on a substrate surface made of a glass epoxy resin in positions corresponding to the above-mentioned flexible substrates 8. A driving IC peripheral circuit (not shown in the figures) which drives the above-mentioned driving ICs 7 is connected to this circuit substrate 3. The above-mentioned flexible substrates 8 are connected to the connection terminals 9 using a thermocompression bonding method. Thereby, as shown in FIG. 2, the light valve 2 is connected to the circuit substrate 3 (indication of the driving ICs 7 being omitted in FIG. 6).

The above-described liquid crystal display device 1 is, for example, provided inside a projection display apparatus (liquid crystal projector), and superimposes an image signal onto a light incident from a light source. In this case, it is preferable that the light incident from the light source passes only through the liquid crystal display element 6. This is because, if the light passes also through a portion of the light valve 2 surrounding a portion which has the liquid crystal display element 6 formed thereon, a light having passed through the surrounding portion acts as a disturbance light. Thereby, a quality of a projected image is degraded.

In order to prevent such a situation, the circuit substrate 3 overlaid on the light valve 2 is used as a shading sheet. Specifically, as shown in FIG. 1, an opening 3a, having a shape corresponding to a shape of the liquid crystal display element 6, is formed in a middle position of the circuit substrate 3. The portion of the light valve 2 surrounding the portion which has the liquid crystal display element 6 formed thereon is covered by the circuit substrate 3. Thereby, generation of the disturbance light can be restricted.

Further, miniaturization of the liquid crystal projector is demanded and accordingly miniaturization and thinning of the liquid crystal display device 1 is demanded. However, the above-described liquid crystal display device 1 uses a glass epoxy substrate as the circuit substrate 3, and the glass epoxy substrate is thick. Thereby, thinning of the liquid crystal display device 1 cannot be achieved.

Further, the liquid crystal display device 1 in the related art uses the TAB. A wide area is required surrounding a display portion (specifically, the liquid crystal display element 6) for providing the TAB therein. As a result, the liquid crystal display device 1 has a wide portion surrounding the display portion. Narrowing the surrounding portion will be referred to as 'narrow framing', hereinafter.

In order to achieve the narrow framing and thinning of a liquid crystal display device, a liquid crystal display device using a flexible printed-circuit board as the circuit board has been provided. FIGS. 3 and 4 show a liquid crystal display device 10 which uses a flexible printed-circuit board 11 as the circuit board. FIG. 3 shows a perspective view of the liquid crystal display device 10 in a state in which an assembling work is in progress. FIG. 4 shows a perspective view of the liquid crystal display device 10 in a state in which the assembling work has been completed. The same reference numerals are given to parts identical to those of the liquid crystal display device 1 shown in FIGS. 1 and 2, and description thereof will be omitted.

The liquid crystal display device 10 has the driving ICs 7 provided on a portion of the emission substrate 4 surrounding a portion which has the liquid crystal display element 6 formed thereon. Input terminal parts 12a and 12b for connecting to the flexible printed-circuit board 11 are formed in a pair of opposite sides of the liquid crystal display element 6 on the emission substrate 4. These input terminal parts 12a and 12b are connected to the driving ICs 7 and liquid crystal display element 6 via electric wirings (not shown in the figures) formed on the emission substrate 4.

The flexible printed-circuit board 11 has an opening 11a, of a shape corresponding to the liquid crystal display element 6, formed in a middle position thereof. When the flexible printed-circuit board 11 has been placed on the light valve 2, the portion surrounding the liquid crystal display element 6 is covered by the flexible printed-circuit board 11. The flexible printed-circuit board 11 has a shading function similar to the above-mentioned circuit board 3. Thereby, it is possible to restrict leakage of a disturbance light from the portion surrounding the liquid crystal display element 6. Accordingly, if the liquid crystal display device 10 is used in the liquid crystal projector, a quality of a projected image can be improved.

The above-mentioned flexible printed-circuit board 11 has connection terminal parts 13a and 13b, for connecting with the light valve 2, formed in a pair of opposite sides thereof.

These connection terminal parts 13a and 13b are connected with the input terminal parts 12a and 12b formed on the emission substrate 4. Thereby, the flexible printed-circuit board 11 is set on the light valve 2.

Specifically, the connection terminal part 13a of the flexible printed-circuit board 11 is connected with the input terminal part 12a formed on the emission substrate 4 using the thermocompression method. Then, the flexible printed-circuit board 11 is folded along a direction A shown in FIG. 3 and thus is positioned at a rear side of the emission substrate 4. Then, the flexible printed-circuit board 11 is further folded so that the connection terminal part 13b of the flexible printed-circuit board 11 faces the input terminal part 12b formed on the emission substrate 4. Then, the connection terminal part 13b is connected to the input terminal part 12b using the thermocompression method. Thereby, the flexible printed-circuit board 11 is set onto the light valve 2.

In the above-described liquid crystal display device 10, the flexible printed-circuit board 11 is thinner than when the glass epoxy substrate is used as the circuit board. Thereby, it is possible to make the liquid crystal display device 10 thinner than the liquid crystal display device 1 shown in FIGS. 1 and 2.

However, in the liquid crystal display device 10 shown in FIGS. 3 and 4, it is necessary to connect one sheet of the flexible printed-circuit board 11 to the input terminal parts 12a and 12b formed in the two sides of the light valve 2. As a result, problems which will now be described occur.

FIG. 5 shows a process in which the connection terminal part 13a of the flexible printed-circuit board 11 is connected with the input terminal part 12a formed on the emission substrate 4 using the thermocompression method. As shown in the figure, a pair of upper and lower heater wedges 14 and 15 hold the input terminal part 12a and connection terminal part 13a between the pair of heater wedges, and the two parts 12a and 13a are heated through the heater wedges while being compressed with one another. Thus, the thermocompression process is performed.

When the input terminal part 12a and connection terminal part 13a are connected using the thermocompression method, as shown in FIG. 5, the thermocompression process is performed in a state in which the flexible printed-circuit board 11 has not been folded. Therefore, it is possible to uniformly compress the input terminal part 12a and connection terminal part 13a using the heater wedges 14 and 15. Thereby, it is possible to surely connect the input terminal part 12a and connection terminal part 13a.

However, when the input terminal part 12b and connection terminal part 13b are then connected, as shown in FIG. 6, the thermocompression process is performed in a state in which the flexible printed-circuit board 11 has been folded. As a result, the thermocompression process is performed in a state in which two sheets of the flexible printed-circuit board 11 are held by and between the pair of heater wedges 14 and 15.

The case where the thermocompression process is performed in a state in which two sheets of the flexible printed-circuit board 11 are held by and between the pair of heater wedges 14 and 15 will now be described. The flexible printed-circuit board 11 has various patterns of electric wirings formed thereon and thus a thickness of the board 11 is not uniform. Thereby, it is not possible to uniformly compress the input terminal part 12b and connection terminal part 13b using the heater wedges 14 and 15. As a result, the connection may not be performed perfectly. If the connection is not performed perfectly, the liquid crystal display element 6 cannot operate correctly.

Further, when the input terminal part 12b and connection terminal part 13b are connected, the input terminal part 12a and the connection terminal part 13a have been connected. As a result, due to an elastic restoration force which the flexible printed-circuit board 11 has, it is not easy to fold the flexible printed-circuit board 11 so as to obtain the state shown in FIG. 6. As a result, the thermocompression process cannot be performed efficiently.

SUMMARY OF THE INVENTION

The present invention has been performed in consideration of the above-described problems. An object of the present invention is to provide a liquid crystal display device in which it is easy to surely perform connection between a flexible circuit substrate and a light valve.

The above-mentioned problems can be solved as a result of using means which will now be described.

A liquid crystal display device according to the present invention comprises:

a light valve loaded with a liquid crystal display element and electronic components which drive the liquid crystal display element, the light valve further having in a periphery thereof input terminal parts to which signals for driving the liquid crystal display element are supplied; and a flexible circuit substrate connected with the input terminal parts; and wherein the circuit substrate is divided into a plurality of division substrates, a number of the plurality of division substrates corresponding to a number of the input terminal parts, the plurality of division substrates being electrically connected to the input terminal parts respectively.

The liquid crystal display device may further comprise connecting means for electrically connecting the plurality of division substrates with each other.

In the liquid crystal display device, the connecting means may comprise an extension portion integrally formed in each of the plurality of division substrates, and connection parts provided in positions facing and connected with the extension parts respectively.

In the liquid crystal display device, the circuit substrate may shade a position, in the light valve, other than a position at which the liquid crystal element is provided.

In the liquid crystal display device:

the input terminal parts may be provided on a front surface of the light valve on which the electronic components are provided; and the circuit substrate may be folded from the input terminal parts and drawn to a rear surface of the light valve on which the electronic components are not provided.

As a result of dividing the circuit substrate into a plurality of division substrates, a number of the plurality of division substrates corresponding to a number of the input terminal parts, the plurality of division substrates being electrically connected the input terminal parts respectively, the connection work can be performed in a condition in which the division substrates are not folded. Thereby, it is possible to uniformly press the division substrates onto the input terminal parts using jigs (heater wedges) in the connection process. Thus, the connection work can be positively performed. Further, even if the division substrates are elastic flexible ones, no elastic restoration force occurs in the division substrates because the connection work is performed in the condition in which the division substrates are not folded. As a result the connection work can be easily performed.

By providing connecting means for electrically connecting the plurality of division substrates with each other, the plurality of division substrates are electrically connected and freedom in arranging electric wires is obtained.

By forming the connecting means to have an extended portion integrally formed in each of the plurality of division substrates, and connection parts provided in positions facing and connected with the extended parts respectively, it is easy to perform electric connection between the division substrates.

By forming the circuit substrate to shade a position, in the light valve, other than a position at which the liquid crystal element is provided, light can be transmitted only at the position at which the liquid crystal element is provided. Thereby, disturbance light can be prevented from occurring.

By providing the input terminal parts on a front surface of the light valve on which the electronic components are provided, and folding the circuit substrate from the input terminal parts to be drawn to a rear surface of the light valve on which the electronic components are not provided, the circuit substrate is placed on the rear surface of the light valve on which the electronic components are not provided. Thereby, the electronic components are not covered by the circuit substrate and therefore it is easy to replace and inspect the electronic components in a case of maintenance or the like.

Other objects and further features of the present invention will become more apparent from the following detailed description when read in conjunction with the accompanying drawings.

DESCRIPTION OF THE PREFERRED EMBODIMENT

An embodiment of the present invention will now be described with reference to figures.

Figure 7:
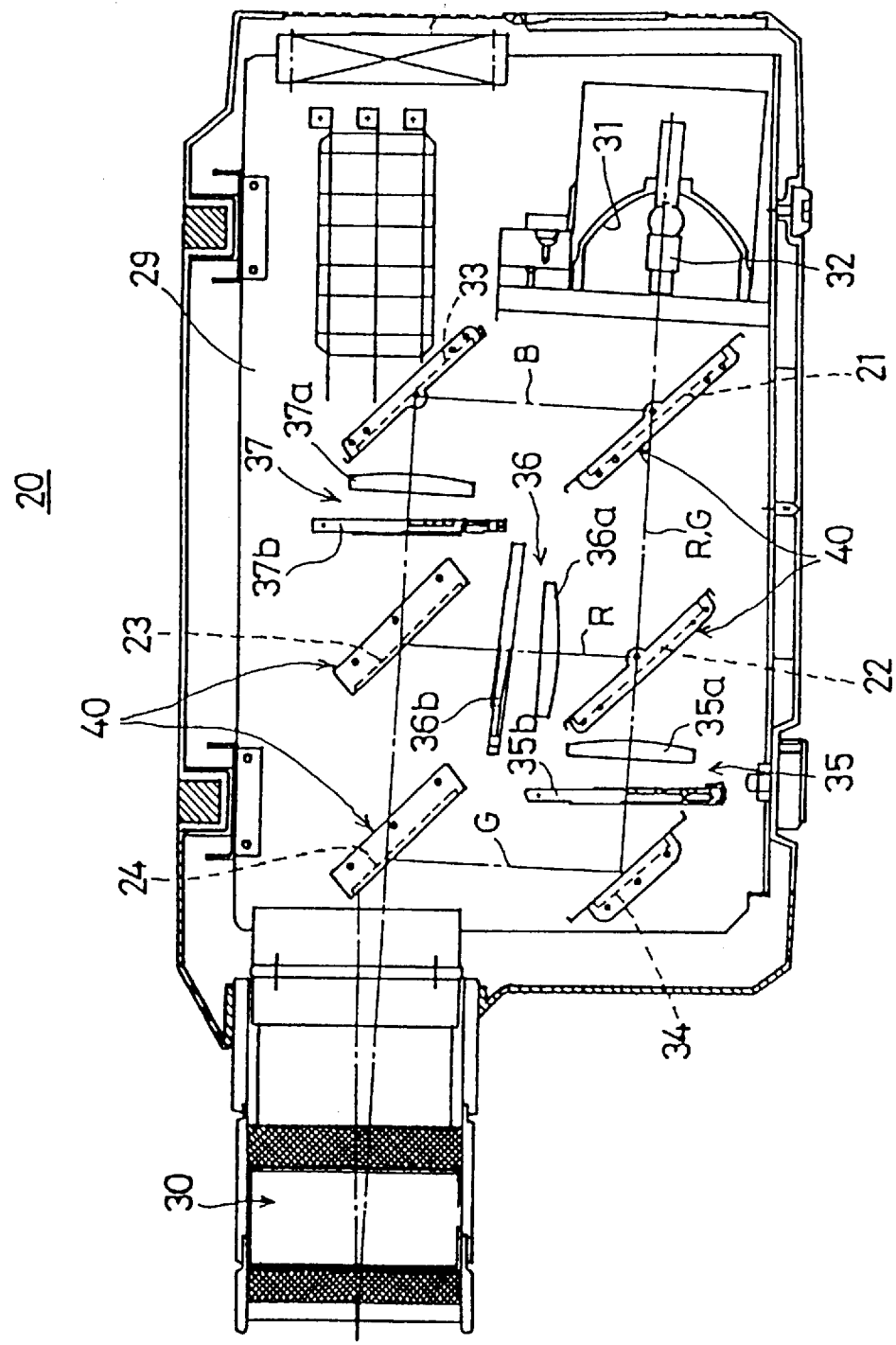
FIG. 7 shows an arrangement of a projection display apparatus in which a liquid crystal display device in one embodiment of the present invention is provided.

FIG. 7 shows an arrangement of a projection display apparatus (liquid crystal projector) 20 in which a liquid crystal display device 50 in the embodiment of the present invention can be applied. In the projection display apparatus 20 shown in the figure, dichroic mirrors (hereinafter referred to as color separation optic mirrors) 21 and 22 act as color separation optic components which separate a light from a light source 32 into three primary colors R (Red), G (Green) and B (Blue) having wavelengths different from each other. The light source 32 generates a white light. Image superimposing units 35, 36 and 37 act as display means which perform image modulation on each color separation light which is obtained as a result of the color separation using the color separation optic mirrors 21, 22. The image superimposing units 35, 36 and 37 generate images of respective primary-color lights based on externally supplied primary-color signals $E_R$, $E_G$ and $E_B$. Further, dichroic mirrors (hereinafter, referred to as synthesis optic mirrors) 23 and 24, acting as synthesis optic components, synthesize these images of respective primary-color lights and thus obtain a color image. Then, a projection lens 30 is used for displaying the color image on a screen (not shown in the figure) which is positioned at a predetermined focus position.

A halogen lamp, a metal halide lamp or the like, for example, is used as the light source 32 which emits white light. A reflection plate 31 reflects the light from the light source 32 and thus emits the light uniformly. In a light path extending from the light source 32 to the projection lens 30, total reflection mirrors 33 and 34 are provided for forming the predetermined light paths shown in FIG. 7.

Each of the image superimposing units 35, 36 and 37 includes a respective one of convergence lenses 35a, 35b and 35c, and a respective one of liquid crystal light valve units 35b, 36b and 37b, in each of which an analyzer, polarizer and the liquid crystal display device 50 (not shown in FIG. 7) are provided. The liquid crystal light valve units 35b, 36b and 37b, change based on the primary-color signals $E_B$, $E_G$ and $E_G$, and thus control light transmission distribution thereof. Thus, the liquid crystal light valve units generate desired images of a blue light, a red light and a green light. These images of the respective primary colors are synthesized by the synthesis optic mirrors 23 and 24, and are thus formed into a color image. The color image is magnified and projected on the screen through a projection lens system including the convergence lenses 35a, 36a, 37a and the projection lens 30.

The above-described optic components which form the projection display apparatus 20 are mounted in a frame 29. In particular, the color separation optic mirrors 21, 22 and synthesis optic mirrors 23, 24 are mounted in the frame 29 using a mounting mechanism 40.

The liquid crystal display device 50 in the embodiment of the present invention will now be described with reference to FIGS. 8, 9 and 10. Arrangements of the three liquid crystal display devices 50 provided in the respective liquid crystal light valve units 35b, 36b and 37b are identical to each other. Accordingly, only one of the three liquid crystal display devices 50 will now be described.

Figure 8:
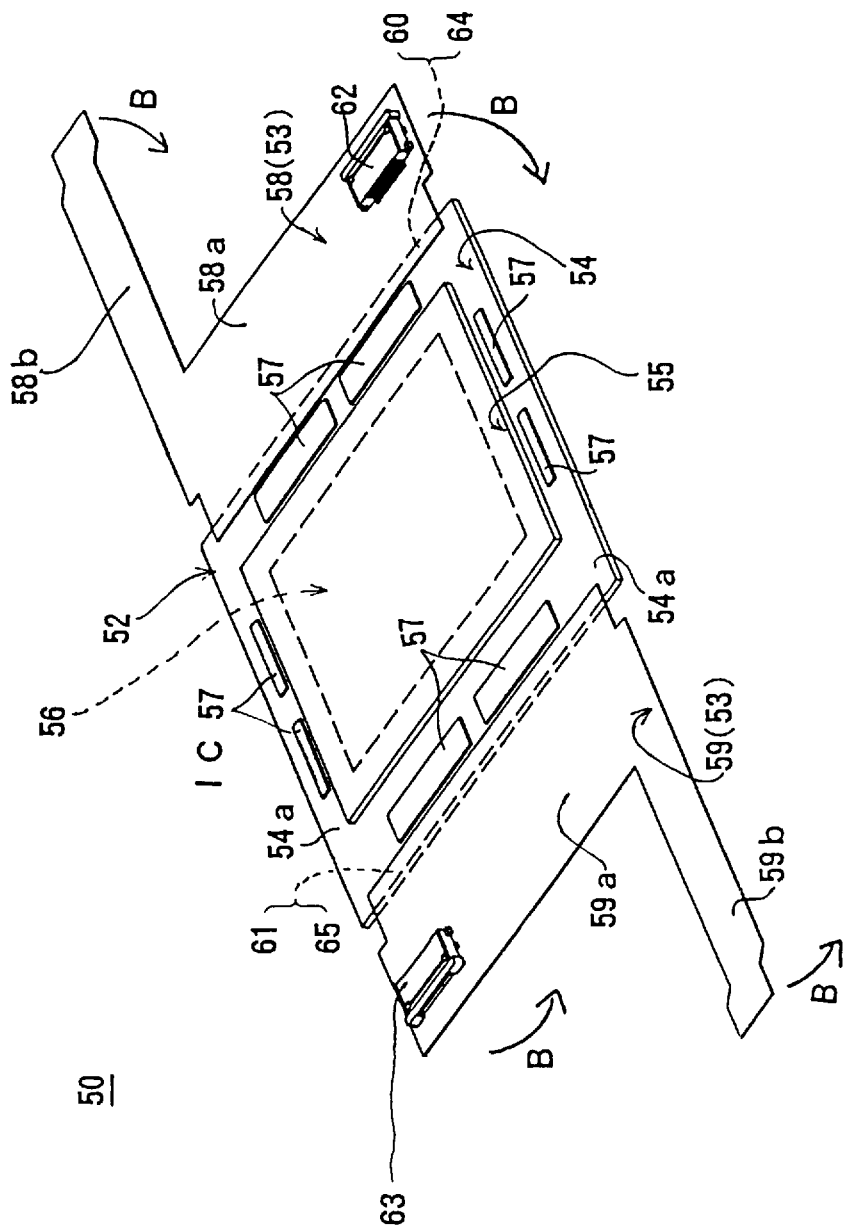
FIG. 8 shows a perspective view of the liquid crystal display device in the embodiment of the present invention in a state in which an assembly work is in progress.

FIG. 8 shows a perspective view of the liquid crystal display device 50 in the embodiment of the present invention in a state in which an assembly work is in progress. FIG. 9 shows a perspective view of a front surface of the liquid crystal display device 50 in the embodiment of the present invention in a state in which the assembly work has been completed. FIG. 10 shows a perspective view of a rear surface of the liquid crystal display device 50 in the embodiment of the present invention in the state in which the assembly work has been completed.

The liquid crystal display device 50 includes a light valve 52 and a circuit substrate 53. The light valve 52 is provided with an emission substrate 54 and an incident substrate 55 (each of the two being made of a glass plate), and a region in the light valve 52, defined by a broken line in each of the figures, acts as a liquid crystal display element 56.

Specifically, in the emission substrate 54 and incident substrate 55, transparent electrodes (X-coordinate electrodes and Y-coordinate electrodes) are provided in a matrix manner. Further, a space between the emission substrate 54 and incident substrate 55 is filled with a liquid crystal. When voltages are applied to two predetermined coordinate electrodes of the transparent electrodes which are provided in the matrix manner, a liquid crystal moves at a position at which the two coordinate electrodes cross, and thus an image is generated by the liquid crystal display element 56.

As previously described with reference to FIG. 7, a light from the light source 32 having undergone the color separation is incident on the liquid crystal display device 50. This incident light is transmitted by the liquid crystal display element 56 according to the image generated by the liquid crystal display element 56. Accordingly, the light transmitted by the liquid crystal display element 56 becomes a light having image information superimposed thereon, the image information being one which has been generated by the liquid crystal display element 56.

An area of the emission substrate 54 is larger than an area of the incident substrate 55. After the incident substrate 55 is overlaid on the emission substrate 54, an edge portion of the emission substrate 54 extends outward from a peripheral portion of the incident substrate 55. This edge portion is like a brim and will be referred to as a brim portion 54a hereinafter. Driving ICs 57 (electronic devices) which drive the liquid crystal display element 56 are provided on the brim portion 54a. Further, ends of the above-mentioned transparent electrodes are drawn out on the brim portion 54a and connected with the driving ICs 57.

The driving ICs 57, via the circuit substrate 53 which will be described later, are connected with a control circuit of the projection display apparatus 20. Image data transferred from the control circuit is distributed through a driving IC peripheral circuit (not shown in the figures) provided on the circuit substrate 53. Thus, distributed image data is supplied to the predetermined ones of the driving ICs 57. Based on the image data which is supplied by the driving IC peripheral circuit, the driving ICs 57 apply voltages to predetermined ones of the transparent electrodes.

Further, on the brim portion 54a of the emission substrate 54, input terminal parts 60 and 61 which will be described later and to which the circuit substrate 53 is connected are formed. These input terminal parts 60 and 61 are formed on two opposite portions in a periphery of the brim portion 54a and thus have the liquid crystal display element 56 positioned therebetween. These input terminal parts 60 and 61 are connected with the driving ICs 57. Thereby, when the circuit substrate 53 is connected with the input terminal parts 60 and 61, the driving IC peripheral circuit, which is provided on the circuit substrate 53, is electrically connected with the driving ICs 57.

The circuit substrate 53 will now be described. The circuit substrate 53 is divided into division substrates, the number of the division substrates corresponds to the number of the input terminal parts 60 and 61. In this embodiment, because the number of the input terminal parts 60 and 61 is two, the number of the division substrates 58 and 59 is two. The division substrates 58, 59 include base portions 58a, 59a and extended portions 58b, 59b, respectively. Thereby, each of the division substrates 58 and 59 is approximately L-shaped. Further, each of the division substrates 58 and 59 is made of a flexible substrate.

Further, on each one of the base portions 58a and 59a of the division substrates 58 and 59, is provided the above-mentioned driving IC peripheral circuit and the respective one of connectors 62 and 63. A position at which the connector 62 provided on the division substrate 58 corresponds to a position of an extending end of the extended portion 59b of the division substrate 59 in the state shown in FIG. 10. Similarly, a position at which the connector 63 is provided on the division substrate 59 corresponds to a position of an extending end of the extended portion 58b of the division substrate 58 in the state shown in FIG. 10. Further, the base portions 58a and 59a of the respective division substrates 58 and 59 have connection terminal parts 64 and 65, respectively. These connection terminal parts 64 and 65 are connected with the above-mentioned input terminal parts 60 and 61, respectively.

A method of assembling the above-described liquid crystal display device 50 will now be described. However, the light valve 52 is assembled in a well-known manner, and therefore only the part of the method starting from setting of the division substrates 58 and 59 onto the light valve 52 will be described.

Positioning is performed so that the connection terminal parts 64 and 65 formed on the division substrates 58 and 59 face the input terminal parts 60 and 61 formed in the light valve 62, respectively. Then, the thermocompression is performed using the heater wedges. The circuit substrate 53 is divided into the two division substrates 58 and 59 according to the number of the input terminal parts 60 and 61 as mentioned above. As a result, the connection between each of the input terminal parts 60, 61 and the respective one of the connection terminal parts 64, 65 using the thermocompression method can be performed in a condition in which each of the division substrates 58 and 59 has not been folded.

Figure 1:
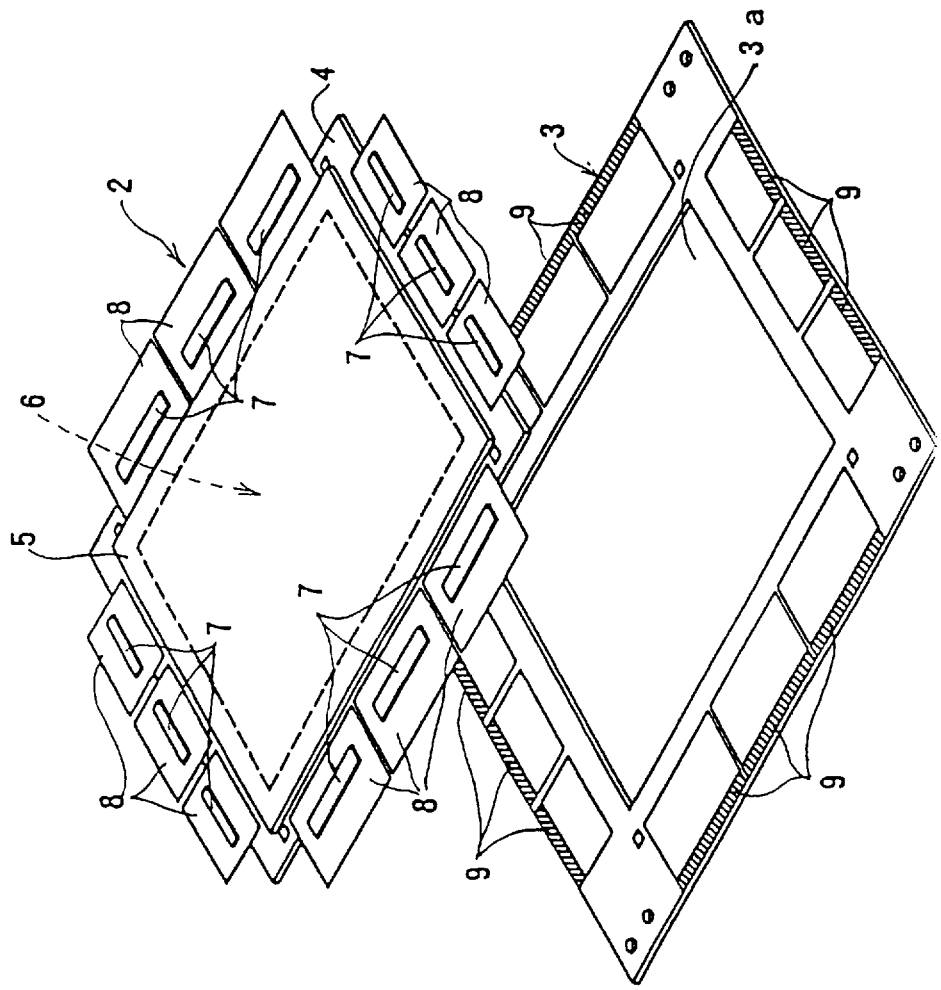
FIG. 1 shows an exploded perspective view of a liquid crystal display device in one example of the related art.
Figure 2:
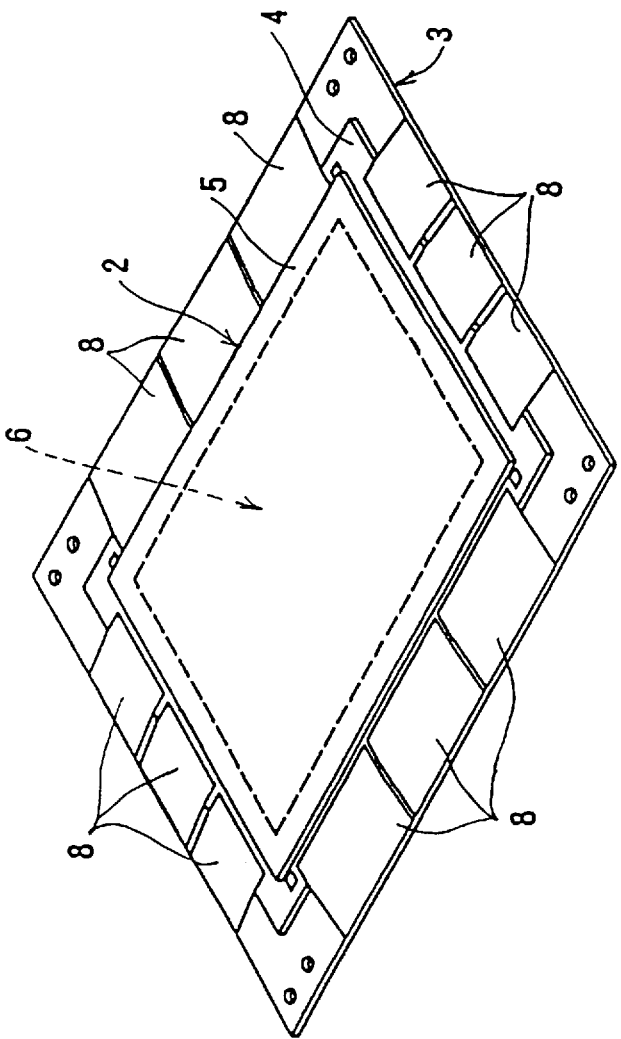
FIG. 2 shows a perspective view of the liquid crystal display device in the example of the related art.
Figure 3:
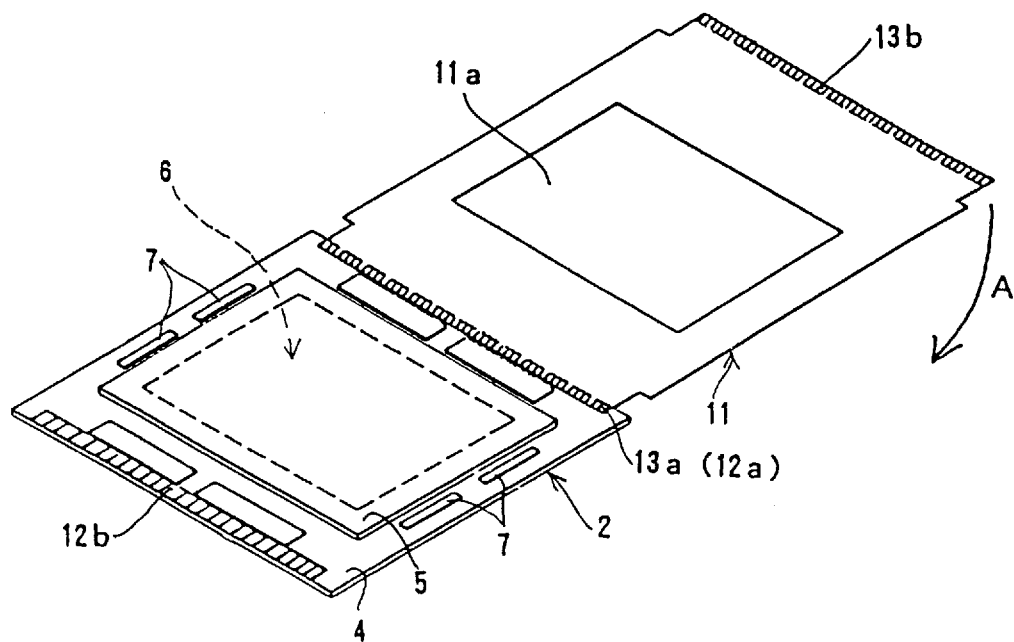
FIG. 3 shows a perspective view of a liquid crystal display device in another example of the related art, in which a flexible printed-circuit board is used as a circuit substrate, in a state in which an assembly work is in progress.
Figure 4:
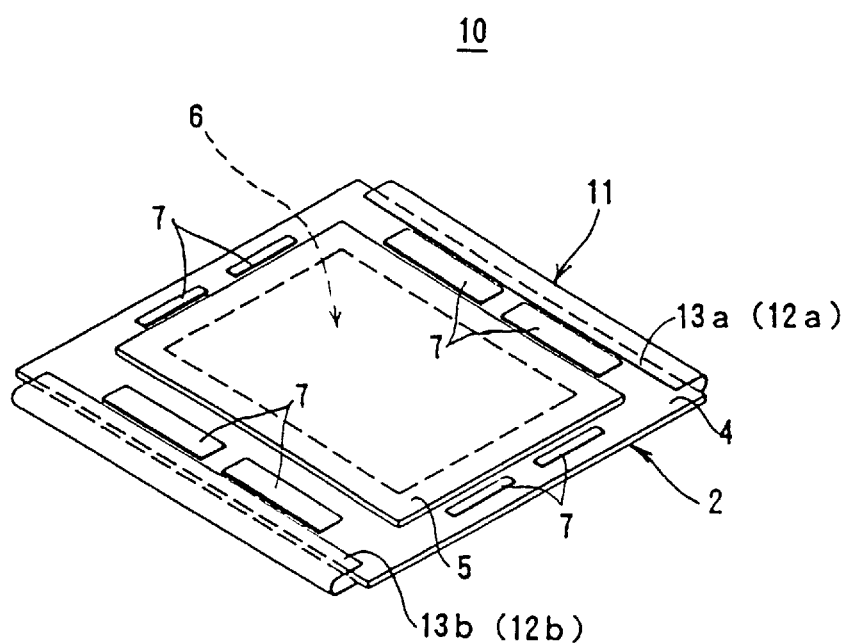
FIG. 4 shows a perspective view of the liquid crystal display device in the other example of the related art, in which the flexible printed-circuit board is used as the circuit substrate, in the state in which the assembly work has been completed.
Figure 5:
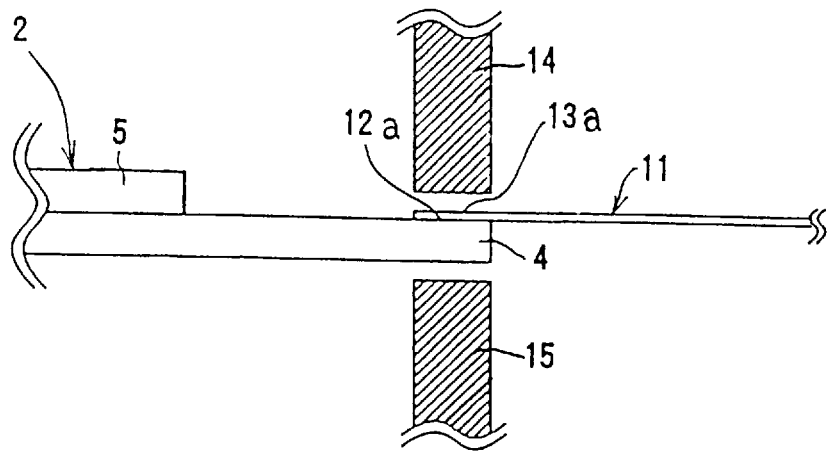
FIGS. 5 and 6 illustrate a thermocompression process.
Figure 6:
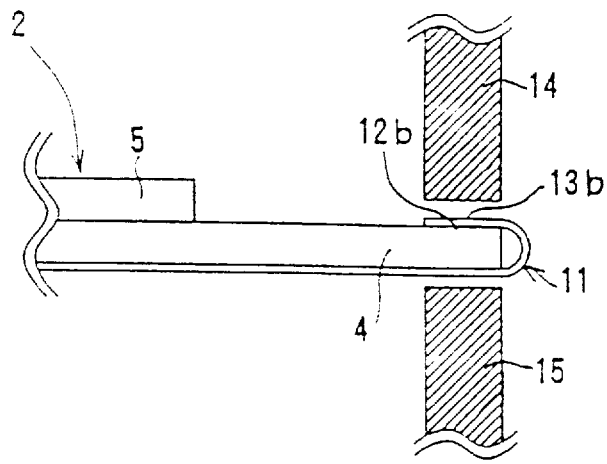

Thereby, in a condition similar to the condition shown in FIG. 5, the connection between each of the input terminal parts 60, 61 and the respective one of the connection terminal parts 64, 65 using the thermocompression method can be performed. As a result, it is possible to uniformly compress each of the input terminal parts 60, 61 and the respective one of the connection terminal parts 64, 65 using the heater wedges in the thermocompression process. As a result, the connection of the light valve 62 with each of the division substrates 58 and 59 can be surely performed.

As described above, the division substrates 58 and 59 are made of flexible substrates and have elasticity. However, the thermocompression process is performed in the condition in which each of the division substrates 58 and 59 has not been folded. Accordingly, when the pair of heater wedges hold each of the connection terminal parts 64, 65 and the respective one of the input terminal parts 60, 61 between the pair of wedges in the condition similar to that shown in FIG. 5, no substantial elastic restoration force occurs in each of the division substrates 58 and 59. As a result, a phenomenon that positioning between each of the connection terminal parts 64, 65 and the respective one of the input terminal parts 60, 61 is degraded due to the elastic restoration force occurring in the respective one of the division substrates 58 and 59 does not occur. Thereby, it is possible to surely connect the light valve 52 with each of the division substrates 58 and 59.

FIG. 8 shows a state in which each of the division substrates 58 and 59 has been connected to the light valve 52 using the thermocompression method.

After each of the division substrates 58 and 59 has been connected to the light valve 52 as described above, each of the division substrates 58 and 59 is folded to a rear side of the light valve 52 (along directions B shown in FIG. 8). Then, each of the extended portions 58b and 59b of the respective division substrates 58 and 59 is connected to the respective facing one of the connector 62 and 63. Specifically, the extension portion 58b is connected to the connector 63 and the extension portion 59b is connected to the connector 62. Each of the extended portions 58b and 59b has a contact portion at the extending end thereof, the contact portion being used for connecting to the respective one of the connectors 62 and 63.

As mentioned above, the extension portions 58b, 59b and connectors 62, 63 act as connecting means which electrically connect the division substrates 58 and 59 with one another. Merely by performing the simple work that the extension portions 58b and 59b are fitted to the connectors 63 and 62, respectively, the electrical connection between the division substrates 58 and 59 can be performed. Further, because the division substrates 58 and 59 are electrically connected with one another, although the circuit substrate 53 is divided into the division substrates 58 and 59, it is possible to obtain freedom in arranging electric wiring on the light valve 52 and division substrates 58 and 59. Thereby, it is easy to design a layout of electronic components and so forth such as those mentioned above.

In the above-described arrangement, a method of connecting the extended portions 58b and 59b to the division substrates 59 and 58, respectively, is not limited to the above-described method using the connectors 63 and 62. For example, it is also possible to use FPC's (Flexible Printed Circuits) for electrically connecting each of the extended portions 58b and 59b to one of the division substrates 59 and 58, respectively.

Figure 9:
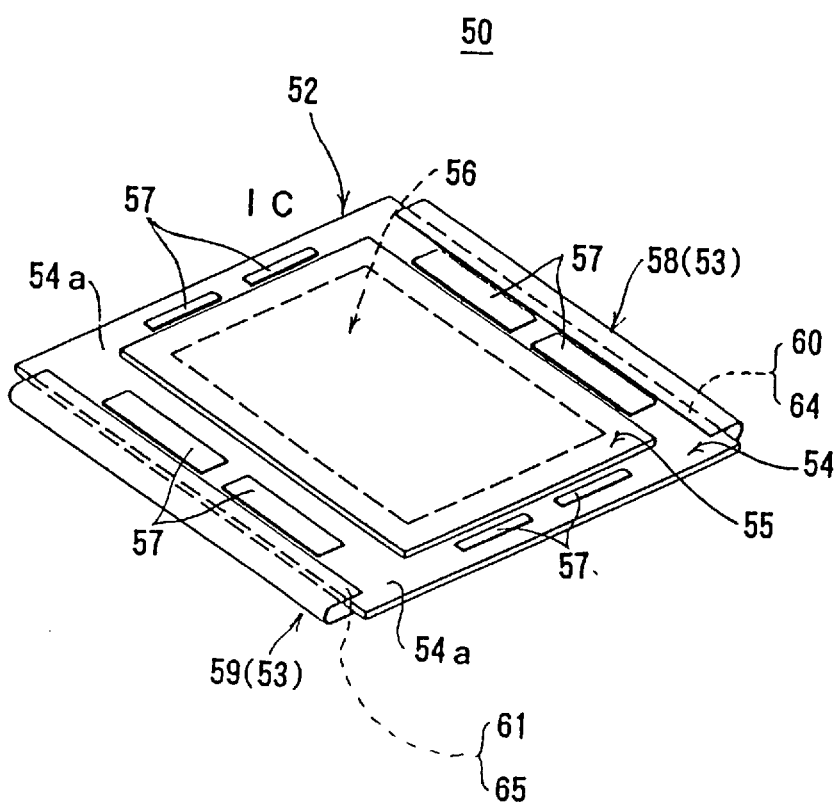
FIG. 9 shows a perspective view of a front surface of the liquid crystal display device in the embodiment of the present invention in a state in which the assembly work has been completed.
Figure 10:
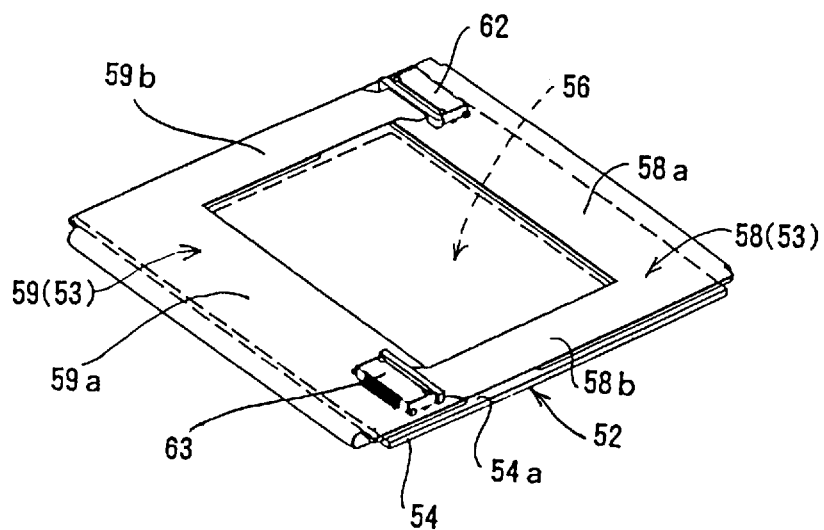
FIG. 10 shows a perspective view of a rear surface of the liquid crystal display device in the embodiment of the present invention in the state in which the assembly work has been completed.

FIGS. 9 and 10 show the liquid crystal display device 50 which has been assembled as described above. As shown in FIG. 9, each of the division substrates 58 and 59 is folded to a rear side of the light valve 52 on which the driving ICs 57 are not provided. Therefore, as shown in FIG. 9, the driving ICs 57 are in an uncovered condition. As a result of the driving ICs 57 not being covered by the circuit substrate 53 (division substrates 58 and 59) as mentioned above, in a case where maintenance is performed or the like, it is easy to replace and inspect the driving ICs 57.

Further, as shown in FIG. 8, each of the division substrates 58 and 59 is approximately L-shaped, and also is connected to the light valve 52 using the thermocompression method so that the division substrates 58 and 59 are symmetrical with respect to the light valve 52. Therefore, in the assembled condition shown in FIG. 10, the frame-shaped brim portion 54a is covered by the division substrates 58 and 59. Each of the division substrates 58 and 59 is made so as to have a shading function and thus not transmit light. Accordingly, a position on the light valve 52, other than a position at which the liquid crystal display element 56 is set, (that is, the brim portion 54a) is shaded by the division substrates 58 and 59. As a result, light can be transmitted only at the position at which the liquid crystal display element 56 is set, and therefore it is possible to prevent disturbance light from occurring. Therefore, by using the liquid crystal display device 50 in the projection display apparatus 20, it is possible to improve a quality of a projected image.

In the above-described embodiment, the two input terminal parts 60 and 61 are provided and accordingly the circuit substrate 53 is divided into the two division substrates 58 and 59. However, a number of the division substrates of the circuit substrate 53 is not limited to the two. If a number of the input terminal parts is large (more than three), the circuit substrate 53 may be accordingly divided into a corresponding number (more than three) of division substrates.

By the present invention, as described above, various advantages which will now be described can be obtained.

When each of the division substrates is connected to a respective one of the input terminal parts, the connection work can be performed in a condition in which the division substrates have not been folded. Thereby, in the connection process, the division substrates can be uniformly pressed onto the input terminal parts using jigs (heater wedges). As a result, the connection work can be positively performed. Further, although the division substrates have elastic flexibility, because the connection work is performed in the condition in which the division substrates have not been folded, no elastic restoration force occurs in the division substrates and therefore the connection work can be easily performed.

Further, because a plurality of division substrates are electrically connected with each other, it is possible to obtain freedom in arranging electric wirings thereon.

Further, by providing an extension portion in each division substrate, electric connection between the plurality of division substrates can be easily performed.

Further, by arranging the circuit substrate so that light can be transmitted only at a position, in the light valve, at which the liquid crystal display element is set, it is possible to prevent disturbance light from occurring.

Further, the circuit substrate is placed to a rear side of the light valve on which electronic components are not provided. Therefore, the electronic components are not covered by the circuit substrate, and therefore, in a case where maintenance is performed or the like, it is easy to replace and inspect the electronic components.

Further, the present invention is not limited to the above-described embodiments, and variations and modifications may be made without departing from the scope of the present invention.

What is claimed is:

1. A liquid crystal display device comprising:
    a light valve loaded with a liquid crystal display element and electronic components which drive said liquid crystal display element, said light valve further having on a periphery thereof input terminal parts to which signals for driving said liquid crystal display element are supplied;
    a flexible circuit substrate connected with said input terminal parts;
    wherein said circuit substrate is divided into a plurality of division substrates, whereby the number of said plurality of division substrates corresponds to the number of said input terminal parts, and each of said plurality of division substrates is electrically connected to one of said input terminal parts; and
    connectors for electrically connecting said plurality of division substrates with each other, wherein each of said connectors comprises an extended portion integrally formed in each of said plurality of division substrates, and connection parts provided in positions facing and connected with said extended portions respectively.

2. The liquid crystal display device, according to claim 1, wherein said circuit substrate shades a position, in said light valve, other than a position at which said liquid crystal display element is provided.

3. The liquid crystal display device, according to claim 1, wherein:
   said input terminal parts are provided on a front surface of said light valve on which said electronic components are provided; and
   said circuit substrate is folded from said input terminal parts and drawn to a rear surface of said light valve on which said electronic components are not provided.

4. The liquid crystal display device, according to claim 1, further comprising a light source and a projection optical member, a light emitted by said light source being modulated by said light valve and then projected, and thus forming a projection-type liquid crystal display device.

5. The liquid crystal display device, according to claim 4, further comprising:
   three of said light valves; and
   an optical member which either separates the light from said light source to three primary colors or synthesizes the three primary colors which have been separated and modulated by said light valves.

6. The liquid crystal display device according to claim 1, wherein during assembly, said division substrates are connected to said light valve in a flat condition such that no tension from folding is applied to said division substrate during the connection process.

7. The liquid crystal display device, according to claim 1, wherein said light valve includes an emission substrate upon which said liquid crystal display element and said electronic components are positioned, and further wherein said electronic components are located on a periphery of said emission substrate in an area outside of said liquid crystal display element.

8. The liquid crystal display device, according to claim 7, wherein said emission substrate includes side ends thereof, and said input terminal parts are located on said side ends such that said terminal parts are located in an area farther from said display element than said electronic components.

9. The liquid crystal display device, according to claim 8, wherein a signal is input to said input terminal parts, through said electronic components, and to said liquid crystal display element to drive said liquid crystal display element.

10. The liquid crystal display device according to claim 1 wherein said division substrates are united in such a manner to effectively form a single sheet.

11. A liquid crystal display device comprising:
   a light valve loaded with a liquid crystal display element and electronic components which drive said liquid crystal display element, said light valve further having on a periphery thereof input terminal parts to which signals for driving said liquid crystal display element are supplied; and
   a flexible circuit substrate connected with said input terminal parts;
   wherein said circuit substrate is divided into a plurality of division substrates, whereby the number of said plurality of division substrates corresponds to the number of said input terminal parts, and each of said plurality of division substrates is electrically connected to one of said input terminal parts;
   further wherein each of said division substrates includes one end connected to said light valve and another end connected to another division substrate.

12. The liquid crystal display device, according to claim 11, further comprising connectors for electrically connecting said plurality of division substrates with each other.

13. The liquid crystal display device according to claim 8 wherein said division substrates are united in such a manner to effectively form a single sheet.

14. The liquid crystal display device, according to claim 11, wherein said circuit substrate shades a position, in said light valve, other than a position at which said liquid crystal display element is provided.

15. The liquid crystal display device, according to claim 11, wherein:
   said input terminal parts are provided on a front surface of said light valve on which said electronic components are provided; and
   said circuit substrate is folded from said input terminal parts and drawn to a rear surface of said light valve on which said electronic components are not provided.

16. The liquid crystal display device, according to claim 11, further comprising a light source and a projection optical member, a light emitted by said light source being modulated by said light valve and then projected, and thus forming a projection-type liquid crystal display device.

17. The liquid crystal display device, according to claim 16, further comprising:
   three of said light valves; and
   an optical member which either separates the light from said light source to three primary colors or synthesizes the three primary colors which have been separated and modulated by said light valves.

18. The liquid crystal display device according to claim 11, wherein during assembly, said division substrates are connected to said light valve in a flat condition such that no tension from folding is applied to said division substrate during the connection process.

19. The liquid crystal display device, according to claim 8, wherein said light valve includes an emission substrate upon which said liquid crystal display element and said electronic components are positioned, and further wherein said electronic components are located on a periphery of said emission substrate in an area outside of said liquid crystal display element.

20. The liquid crystal display device, according to claim 19, wherein said emission substrate includes side ends thereof, and said input terminal parts are located on said side ends such that said terminal parts are located in an area farther from said display element than said electronic components.

21. The liquid crystal display device, according to claim 20, wherein a signal is input to said input terminal parts, through said electronic components, and to said liquid crystal display element to drive said liquid crystal display element.

* * * * *

UNITED STATES PATENT AND TRADEMARK OFFICE
CERTIFICATE OF CORRECTION

PATENT NO. : 5,841,501
DATED : November 24, 1998
INVENTOR(S) : Eiraku et al.

It is certified that error appears in the above-identified patent and that said Letters Patent is hereby corrected as shown below:

Column 9, line 35, delete "FPC's" and insert

--FPCs-- therefor

Column 12, line 43, delete "claim 8" and insert --claim 11-- therefor

Signed and Sealed this

Seventh Day of December, 1999

Attest:

Q. TODD DICKINSON

Attesting Officer    Acting Commissioner of Patents and Trademarks